United States Patent [19]

Marui

[11] Patent Number: 5,033,111
[45] Date of Patent: Jul. 16, 1991

[54] RADIO TELECOMMUNICATION APPARATUS

[75] Inventor: Kuniyoshi Marui, Saitama, Japan

[73] Assignee: Kabushiki Kaisha Toshiba, Kanagawa, Japan

[21] Appl. No.: 316,922

[22] Filed: Feb. 28, 1989

[30] Foreign Application Priority Data

Feb. 29, 1988 [JP] Japan ............................... 63-46077
Mar. 31, 1988 [JP] Japan ............................... 63-79324

[51] Int. Cl.$^5$ ............................................. H04B 1/04
[52] U.S. Cl. ........................................ 455/127; 455/89
[58] Field of Search ............ 455/127, 89, 78, 79, 455/119, 83, 69, 343

[56] References Cited

U.S. PATENT DOCUMENTS 3,169,221  2/1965  Franchi ................................. 455/79
3,962,553  6/1976  Linder et al. ......................... 455/89
4,731,814  3/1988  Becker et al. ....................... 455/127
4,853,972  8/1989  Ueda et al. ........................... 455/78

FOREIGN PATENT DOCUMENTS

0193724  8/1988  Japan .................................. 455/127

Primary Examiner—Reinhard J. Eisenzopf
Assistant Examiner—Kinfe-Michael Negash
Attorney, Agent, or Firm—Banner, Birch, McKie & Beckett

[57] ABSTRACT

A radio telecommunication apparatus comprises a control for controlling a power supply so that power is supplied to a modulator in response to a request to transmit signals. Furthermore signals to be transmitted are not applied to the modulator until the modulator has been locked to an appropriate frequency. Also, an amplifier for amplifying an output signal of the modulator is not supplied power until the modulator has been substantially locked to an appropriate frequency.

12 Claims, 5 Drawing Sheets

RADIO TELECOMMUNICATION APPARATUS

FIELD OF THE INVENTION

The present invention relates to the field of radio telecommunication apparatus such as mobile telephones, portable telephones, cordless telephones, or the like and more specifically to radio telephones in which power is supplied by a battery.

BACKGROUND OF THE INVENTION

Recently various kinds of radio telephones have been developed. One of these is generally referred to as a mobile radio telephone. The mobile radio telephone, which may be mounted in a car, a train, a ship, an airplane or the like, comprises a transceiver unit with an antenna and telephone unit including a handset and a base unit. These units are physically separated and are connected by signal lines to one another. The transceiver receives power from the battery normally used with the vehicle.

Another kind of radio telephone may be referred to as a portable telephone. Portable telephones may be further divided into two groups: a transportable type and a handheld type. In the transportable type of portable radio telephone, a transceiver unit is combined into a main unit of a telephone unit and an antenna is attached to the main unit; consequently a user may carry the transportable telephone wherever the user goes. In the handheld type, all components are compacted into one unit which may be held in the user's hand. Like the mobile units discussed above, these radio telephones also receive power from a battery. Differentiated from the kinds of radio telephone mentioned above, there is yet a further kind of radio telephone, namely a cordless telephone. The cordless telephone has one or more base units connected to one or more land lines and one or more handheld units. The handheld unit communicates with another telephone apparatus by establishing a radio channel with the base unit. This handheld unit also receives power from a battery.

Generally, it is desirable to reduce power consumption in a radio telephone since the battery installed therein or in the vehicle has a limited power capacity.

In prior art radio telephones, both a reception section and transmission section receives power after the main power switch is turned on whether or not the transmission section actually transmits any signals. Accordingly, an inordinate amount of power is consumed.

Most radio telephone systems include a modulator section and a power amplifier section. Any attempt to conserve power by supplying power to these section only when transmission is desired would have an adverse effect on the system. If the modulator modulates the desired signals before locking onto the appropriate frequencies, unwanted radio waves or spurious radiation will be produced.

SUMMARY OF THE INVENTION

It is accordingly an object of the present invention to provide an improved radio telecommunication apparatus capable of conserving battery power.

It is a still further object of the invention to provide further energy conservation by separately and sequentially supplying power to the modulator and power amplifier sections before transmission is made.

It is a further object of the present invention to provide an improved radio telecommunication apparatus in which a modulator is not actuated until the desired signals are to be transmitted.

It is a further object of the present invention to provide an improved radio telecommunication apparatus which is prevented from radiating unwanted radio waves or spurious radiation while the modulator is turned on.

In achieving these objects, the invention comprises transmitting means including modulating means for transmitting information signals; means for detecting the presence of information signals to be transmitted by the apparatus; power supply means for supplying sections of the apparatus with electrical power; a power switch for supplying power to the apparatus; and control means, coupled to the detection means, for controlling the supply of power so that at least some of the sections of the apparatus, except the modulating means, is supplied power in response to the actuation of the power switch and for supplying power to the modulating means when an information signal is detected.

Additionally, the invention comprises signal sources for providing signals to be transmitted; modulating means for modulating the applied signals; switching means coupled to each of the signal sources and the modulating means for selectively applying the signals provided by the signal source to the modulating means; a power switch actuatable by a user of the apparatus; detecting means for detecting a request to transmit the signals; power supply means for supplying each component of the apparatus with power; and control means, coupled to the detecting means, for controlling the supply of power so that at least some of the components, except the modulating means, in supplied power in response to the actuation of the power switch for supplying power to the modulating means only when a request to transmit is detected; the control means also controlling the switching means for applying the signals provided by the signal source to the modulating means only after the request to transmit is detected.

The prior art problems, described above, are solved by the principles of the present invention. A modulator included in a transmitter section is supplied power only after a request for signal transmission is detected. In response to a request for transmission the power supply is then coupled to the modulator. For example, requests for signal transmission include: a request by a user to originate a call; a response to an incoming call; and transmission of identification signals to a base station within a cellular system. Furthermore, the desired signals are applied to the modulator only when the output of the modulator has been locked to an appropriate frequency or only when a predetermined time period has elapsed after the modulator receives power. Therefore, the radio telephone apparatus in accordance with the present invention prevents the radiation of the unwanted radio waves or spurious signals which would occur if the desired signals were applied to the modulator before frequency locking had been completed.

As a result, the system of the present invention conserves battery power by limiting the time power is supplied to the modulator. In addition, power is further conserved since it isn't supplied to the amplifier until after locking occurs. In addition, the delayed operation of the power amplifier further prevents any transmission of spurious radiation prior to locking.

DETAILED DESCRIPTION

A preferred embodiment of the present invention applied in a handheld type radio telephone will be described with reference to the accompanying drawings. The present invention may likewise be employed in other kinds of radio telephone apparatus or data transmission apparatus using radio channels.

Figure 1:
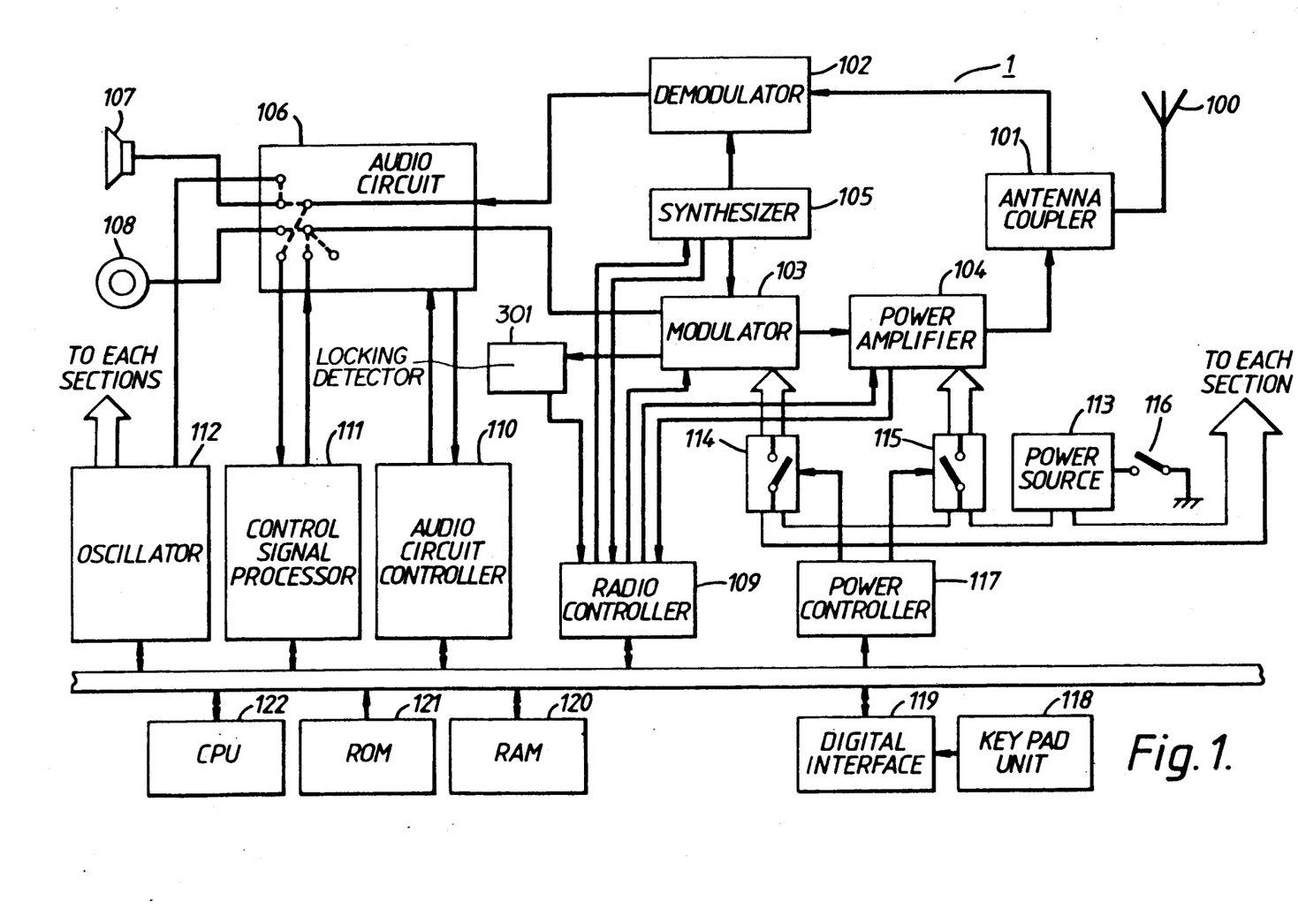
FIG. 1 is a block diagram showing an arrangement of a portable radio telephone apparatus according to one embodiment of the present invention.

FIG. 7 is a block diagram showing an arrangement of the portable radio telephone according to one embodiment of the present invention.

Referring of FIG. 1, a portable radio telephone comprises an antenna 100, an antenna coupler 101, a demodulator 102, a modulator 103, a power amplifier 104, a synthesizer 105, an audio circuit 106, a receiver (loudspeaker/earphone) 107, microphone 108, a radio controller 109, a locking detector 301, an audio circuit controller 110, a control signal processor 111, an oscillator 112, a power source 113, switches 114, 115, an on-/off switch 116 a power controller 117, a key pad unit 118, a digital interface 119, RAM 120, ROM 121, and CPU 122.

Signals received at antenna 100 are applied to demodulator 102 through antenna coupler 101. Demodulator 102 demodulates the signals and outputs demodulated signals to audio circuit 106. In audio circuit 106, the output of demodulator 102 is selectively connected to receiver 107 or control signal processor 111 under control of audio circuit controller 110. On the other hand, speech signals provided from microphone 108 or control signals provided from control signal processor 111 are applied to modulator 103 through audio circuit 106. The control signals can include, for example, signals which identify the remote unit to a base station within a cellular system.

Modulator 103 modulates the signals and outputs the modulated signals to power amplifier 104. Power amplifier 104 amplifies the signals from modulator 103. The amplification of power amplifier 104 is variable, e.g., 8-step variable. The amplified signals are transmitted through antenna coupler 101 to antenna 100. Synthesizer 105 provides demodulator 102 and modulator 103 with signals having a frequency, used for demodulation in demodulator 102 and for modulation in modulator 103. Radio controller 109 controls synthesizer 105, modulator 103 and power amplifier 104. Radio controller 109 controls synthesizer 105 by supplying signals indicative of available frequencies to synthesizer 105, controls modulator 103 by sending signals indicative of various modulation factors, to modulator 103, and controls power amplifier 104 by sending signals indicative of amplification level. Also radio controller 109 receives output power detection signals from power amplifier 104 and supplies them to CPU 122. The control signals from radio controller 109 are supplied in response to instruction signals from CPU 122.

In audio circuit 106, the output of demodulator 102 is selectively connected to receiver 107. In addition, control signal processor 111, microphone 108 or control signal processor 111 is selectively connected to the input of modulator 103 under control of audio circuit controller 110. As will be discussed, signals may not be supplied in some situations, to modulator 103 until after frequency locking has occurred. Also, loudspeaker/earphone 107 may be connected to oscillator 112 for generating a ringer tone under control of audio circuit controller 110. Control signal processor 111 acquires bit and frame synchronization with received synchronization signals and detects an incoming call signal within the received control signals. Also control signal processor 111 generates control signals for transmission and supplies them to modulator 103 via audio circuit 106. Oscillator 112 supplies clock signals to CPU 122 and divides the clock signals for supplying appropriately frequency divided timing pulses to each section of the apparatus requiring them.

Responsive to the closure of switch 116, power is supplied to each section of the apparatus from power source 113. Under control of power controller 117, switch 114 interrupts the path of power to modulator 103 from power source 113 and switch 115 interrupts the path of power to power amplifier 104 from power source 113.

Inputs from key pad unit 118 are sent to CPU 122 via digital interface 119. RAM 120 stores the various data required during processing by CPU 122. ROM 121 stores various programs required for operations of CPU 122.

Figure 2:
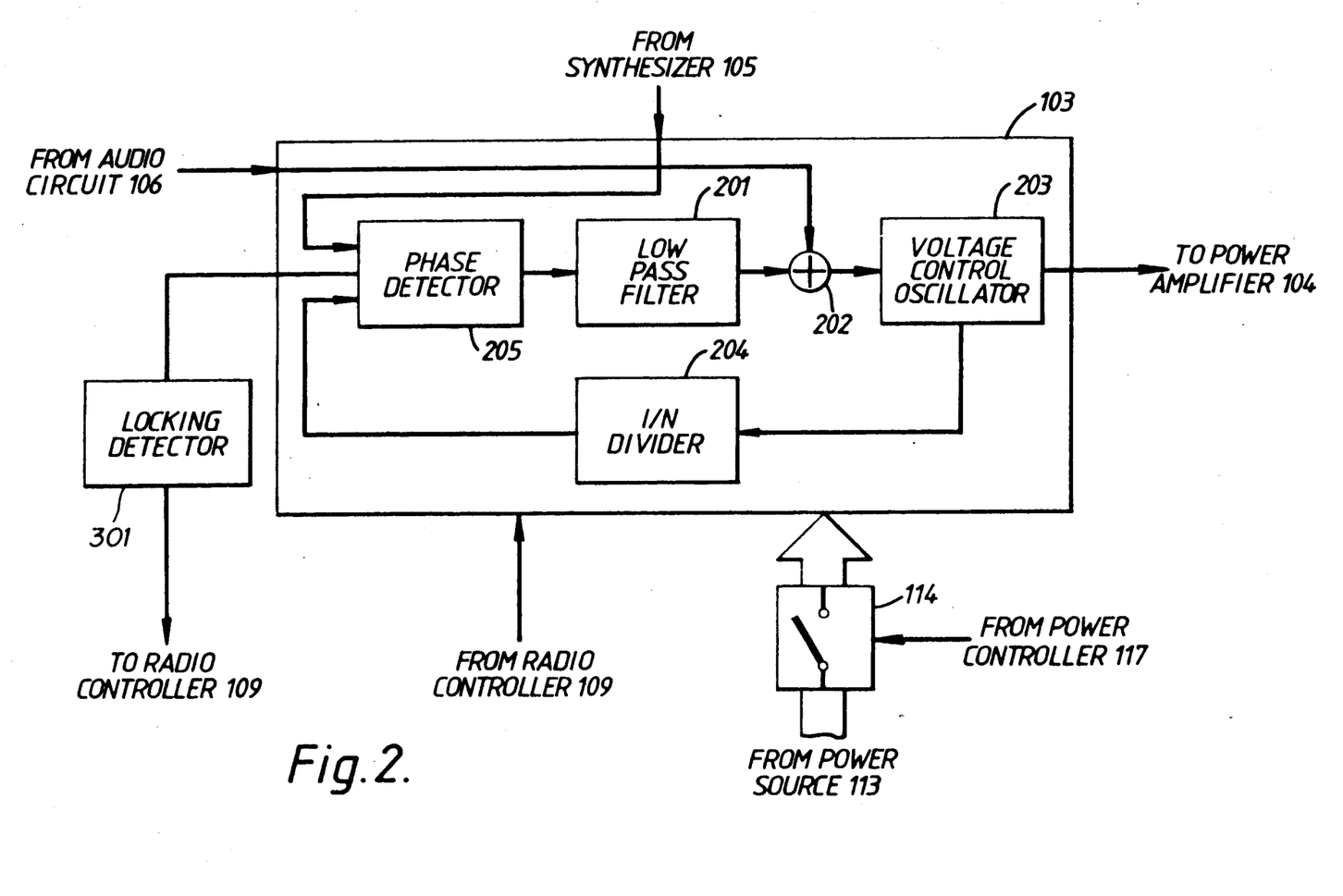
FIG. 2 is a block diagram of the modulator 103 shown in FIG. 1.

FIG. 2 is a block diagram of modulator 103 shown in FIG. 1. Transmission signals to be modulated from audio circuit 106 are added to the output of a low pass filter 201 at an adder 202 and applied to voltage control oscillator 203. Voltage control oscillator 203 oscillates in response to the applied signals and provides modulated signals to a power amplifier 104. Also the output of voltage control oscillator 203 is supplied as a feedback signal to a phase detector 205 after being divided by a 1/N frequency divider 204. Phase detector 205 compares the feedback signals with signals from synthesizer 105 in response to the oscillator signals provided by oscillator 112 and applies signals to low pass filter 201.

Figure 3:
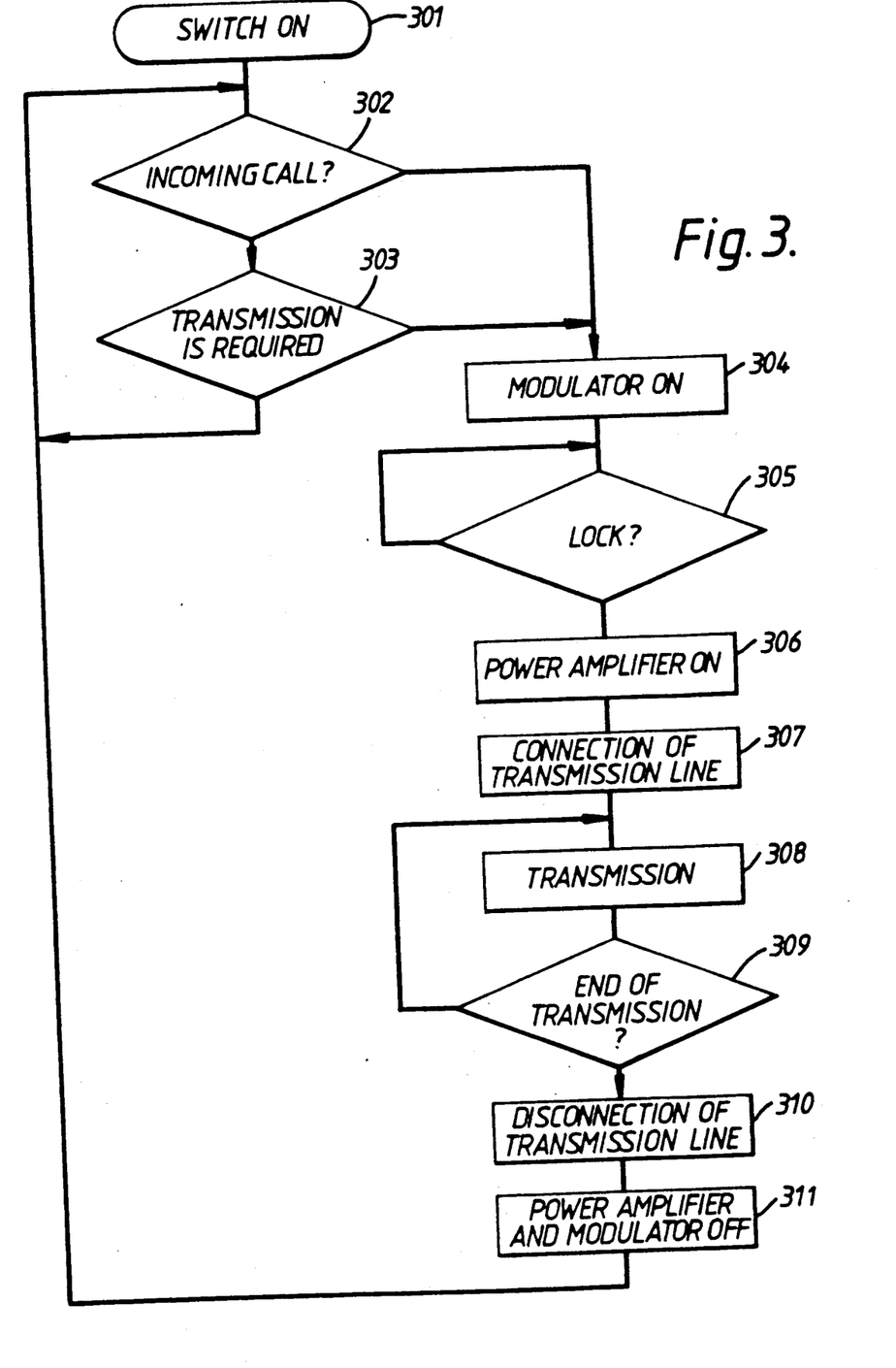
FIG. 3 is a flow chart showing the operation of the radio telephone shown in FIG. 1.

The operation of the portable radio telephone in accordance with the embodiment of FIG. 1 will be described in reference to FIG. 3. Referring to FIG. 3, when on/off switch 116 is closed (step 301), power is supplied from power source 113 to each section of the apparatus except modulator 103 and power amplifier 104 assuming switches 114 and 115 are open in the initial state. Then CPU 122 loads predetermined programs from ROM 121. As a result, CPU 122 controls audio circuit 106 via audio circuit controller 110 so that the output of demodulator 102 is connected to control signal processor 111 but neither microphone 108 nor control signal processor 111 is connected to modulator 103. Therefore, signals received via antenna 100 and antenna coupler 101 are demodulated by demodulator 102 and applied to control signal processor 111 via audio circuit 106. Control signal processor 111 acquires bit and frame synchronization with the received signals and detects whether an incoming call is being received. In case an incoming call is being received, control signal processor 111 sends a detection signal to CPU 122. CPU 122 awaits the receipt of a detection signal from control signal processor 111 (step 302).

In addition, CPU 122 also awaits for detection of a request indicating a call origination or awaits for control signals (e.g., identification signals) (step 303). A request for call origination is made on key pad unit 118 and sent to CPU 122 via digital interface 119. Certain control signals, such as indentification signals are frequently sent to the base station as is conventionally known. The timing for these signals are produced by CPU 122.

In the event CPU 122 receives a detection signal from control signal processor 111 or detects a request for transmission, CPU 122 controls power controller 117 for closing switch 114. Accordingly, modulator 103 is supplied power from power source 113 (step 304). Then radio controller 109 sends a control signal indicative of the modulation frequency to synthesizer 105 and modulation factor signals to modulator 103 under control of CPU 122. Responsive to the signal provided by synthesizer 105 and the modulation factor signals provided by radio controller 109, modulator 103 produces a modulation signal. As a result, the phase lock loop circuit in modulator 103 attempts to lock onto a modulation frequency (step 305). Locking detector 301 detects whether the modulation frequency has locked. If the modulation frequency is locked, locking detector 301 sends a locking signal to CPU 122 via radio controller 109. As a result, CPU 122 controls power controller 117 for closing switch 115. Accordingly, power amplifier 104 is supplied power from power source 113 (step 306). CPU 122 controls audio circuit controller 110 which, in turn, controls audio circuit 106 to either connect the output of processor 111 to the input of modulator 103 or connect microphone 108 to the input of modulator 103. Thus, a transmission line is formed for connecting information signals to modulator 103 (step 307).

Thereafter, transmission of control signals or speech signals are made (step 308). CPU 122 determines whether the transmission has concluded (step 309) and, if so, signals are supplied to audio circuit controller 110 so that audio circuit 106 disconnects the input of modulator 103 from either control signal processor 111 or microphone 108. Thus, disconnection of the transmission line is made (step 310). Successively, CPU 122 controls power controller 117 so that switches 114 and 115 are opened. Thereby, the power to modulator 103 and power amplifier 104 is turned off (step 311) and the operation of the apparatus returns to step 302.

Figure 4:
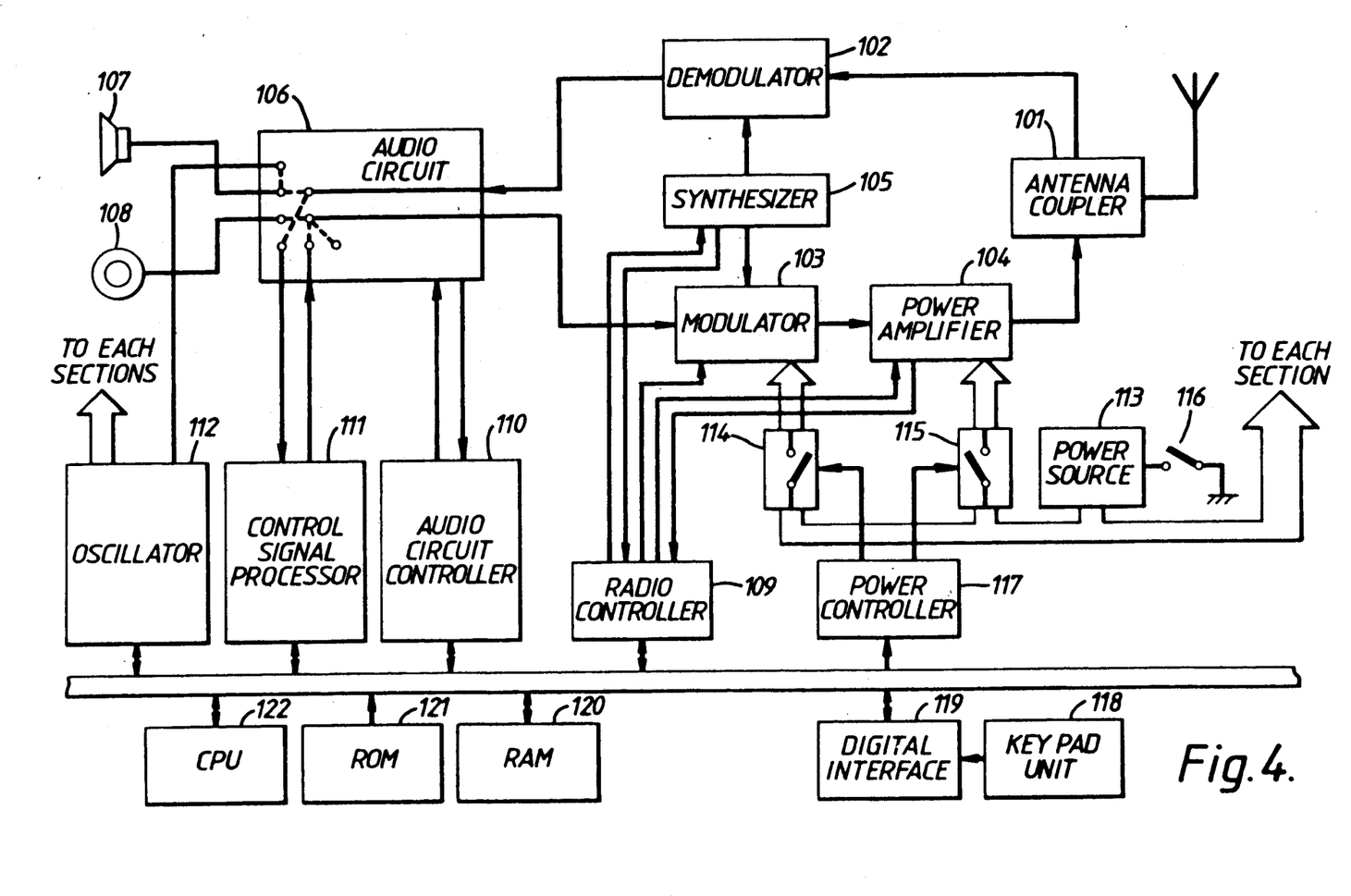
FIG. 4 is a block diagram of arrangement of another embodiment of the present invention.

FIG. 4 is a block diagram showing another embodiment of the present invention. The arrangement of this embodiment corresponds to the previous embodiment with locking detector 301 omitted. Each identified component or section has the same function as previously described above except that the locking of modulator 403 is not detected. A detection signal indicative of locking is not transmitted to radio controller 409 and the operation of CPU 422 is slightly different from the operation of CPU 122 in FIG. 1. That is, a predetermined time period is selected for locking to occur. After that period has elapsed, the circuit will perform as described in the previous embodiment.

Figure 5:
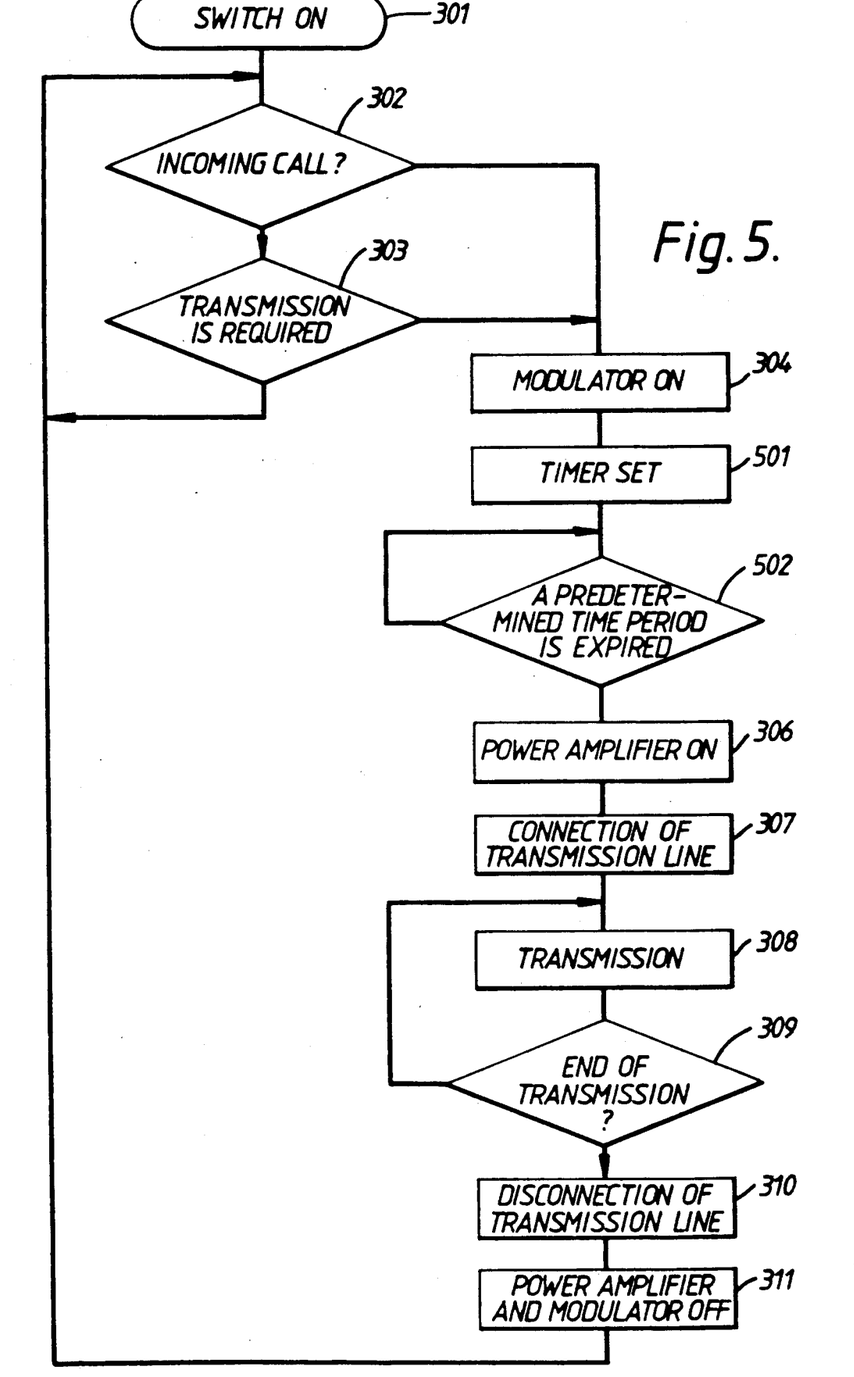
FIG. 5 is a flow chart showing the operation of the radio telephone shown in FIG. 4.

The operation in accordance with this embodiment is shown in FIG. 5. In FIG. 5, steps which perform the same function as steps in FIG. 3 have been given the same reference numerals as in FIG. 3. Referring to FIG. 5, after power is supplied to modulator 403 (i.e., switch 114 is activated), CPU 422 sets an internal timer thereof, which counts the pulses provided from oscillator 112 (step 501). Thereafter CPU 422 awaits for the timer to count a predetermined time period (step 502). The predetermined time period is sufficient for modulator 403 to lock onto a modulation frequency. After the time period has expired, power is then supplied to power amplifier 104 (i.e., switch 115 is actuated). Thereafter the operation of the apparatus proceeds in accordance with the same steps described above in FIG. 3.

According to the above embodiments the apparatus may prevent spurious radiation while conserving battery power. Because power amplifier 104 is not supplied power until modulator 103 or 403 has been locked or until a predetermined time period has passed from the time when either modulator 103 or 403 is supplied power. Even if power amplifier 104 is always activated after on/off switch 116 is closed, spurious radiation does not occur. Spurious radiation is precluded since the signals to be transmitted are not supplied to modulator 103 (or 403) until it has been locked or until a predetermined time period has elapsed from the time power is supplied to the modulator.

I claim:
1. A telecommunication apparatus including a plurality of circuit components for transmitting information signals comprising:
   transmitting means including modulating means for transmitting information signals;
   means for detecting the presence of at least one of said information signals to be transmitted by said apparatus;
   power supply means for supplying said plurality of circuit components with electrical power;
   a power switch coupled to said power supply means;
   control means, coupled to said detecting means, for controlling the supply of power to some of said plurality of circuit components including at least said modulating means, such that said some of said plurality of circuit components are not supplied power in response to the actuation of said power switch and for supplying power to said some of said plurality of circuit components including at least said modulating means only when said at least one of said information signals is detected; and
   receiving means for receiving an incoming call signal and wherein said detecting means detects the presence of said information signal to be transmitted in response to the reception of said incoming call signal.

2. The apparatus of claim 1 wherein said detecting means comprises sensing means for sensing an input requesting a call origination.

3. A radio telecommunication apparatus including a plurality of circuit components for transmitting information signals comprising:
   signal sources for providing signals to be transmitted;
   modulating means for modulating the provided signals;
   switching means coupled to each of said signal sources and said modulating means for selectively applying the signals provided by said signal sources to said modulating means;
   a power switch actuable by a user of the apparatus;
   detecting means for detecting a request to transmit at least one of said information signals;
   power supply means for supplying said plurality of circuit components with power;

control means, coupled to said detecting means, for controlling the supply of power to some of said plurality of circuit components including at least said modulating means, such that said some of said plurality of circuit components are not supplied power in response to the actuation of said power switch and for supplying power to the some of said plurality of circuit components including at least said modulating means only when a request to transmit is detected, said control means also controlling said switching means for supplying the provided at least one of said information signals to said modulating means only after the request to transmit is detected; and locking detection means coupled to said modulating means for detecting when said modulating means is frequency locked and for generating a locking detection signal and wherein said control means in response to the locking detection signal controls said switching means so that the provided at least one of said information signals are supplied to said modulating means.

4. A radio telecommunication apparatus including a plurality of circuit components for transmitting information signals comprising:

signal sources for providing the information signals to be transmitted;

modulating means for modulating the provided information signals;

switching means coupled to each of said signal sources and said modulating means for selectively applying at least one of said information signals provided by said signal sources to said modulating means;

a power switch actuable by a user of the apparatus;

detecting means for detecting a request to transmit said at least one of said information signals;

power supply means for supplying said plurality of circuit components with power; and control means, coupled to said detecting means, for controlling the supply of power to some of said plurality of circuit components including at said modulating means, such that said some of said plurality of circuit components are not supplied power in response to the actuation of said power switch and for supplying power to said some of said plurality of circuit components including at least said modulating means only when said at least one of said information signals is detected, said control means controls said switching means so that the provided signals are supplied to said modulating means after a predetermined time period has elapsed from the time when said modulating means is initially supplied power by said power supply means.

5. A radio telecommunication apparatus including a plurality of circuit components for transmitting information signals comprising:

transmitting means including modulating means and amplifying means for transmitting information signals;

means for detecting the presence of at least one of said information signals to be transmitted by said apparatus;

power supply means for supplying said plurality of circuit components with power;

a power switch coupled to said power supply means actuable by a user of said apparatus;

control means, coupled to said detecting means, for controlling the supply of power to some of said plurality of circuit components including at least said modulating means and said amplifying means, such that said some of said plurality of circuit components are not supplied power in response to the actuation of said power switch and for supplying power to said modulating means and said amplifying means only after an information signal is detected; and locking detection means coupled to said modulating means for detecting when said modulating means is frequency locked and for generating a locking detection signal and wherein said control means supplies power to said modulating means immediately after an information signal is detected and supplies power to said amplifying means in response to the locking detection signal.

6. A radio telecommunication apparatus including a plurality of circuit components for transmitting information signals comprising:

transmitting means including modulating means and amplifying means for transmitting information signals;

means for detecting the presence of at least one of said information signals to be transmitted by said apparatus;

power supply means for supplying said plurality of circuit components with power;

a power switch coupled to said power supply means actuable by a user of said apparatus; and control means, coupled to said detecting means, for controlling the supply of power to some of said plurality of circuit components including at least said modulating means and said amplifying means, such that said some of said plurality of circuit components are not supplied power in response to the actuation of said power switch and for supplying power to said some of said plurality of circuit components including at least said modulating means and said amplifying means only when said information signal is detected, said control means supplies power to said amplifying means after a predetermined time period has elapsed from the time when said control means initially supplies power to said modulating means.

7. A radio telecommunication apparatus for transmitting radio frequency signals, comprising:

modulating means for modulating signals to be transmitted;

amplifying means connected to said modulating means for amplifying the modulated signals;

power supply means for supplying said modulating means and said amplifying means with electrical power;

detecting means for detecting the presence of at least one of said signals to be transmitted by said apparatus; and control means coupled to said detecting means for controlling said power supply means so that said amplifying means is supplied power by said power supply means after the power supply to said modulating means is initiated in response to a detection of the presence of the signal to be transmitted.

8. The apparatus of claim 7 further comprising locking detection means coupled to said modulating means for detecting when said modulating means is frequency locked and for generating a locking detection signal and wherein said control means controls said power supply means so that said amplifying means is supplied power in response to the locking detection signal.

9. The apparatus of claim 7 wherein said control means controls said power supply means so that said modulating means is supplied power after a predetermined time period has elapsed from the time when said modulating means is initially supplied power by said power supply means.

10. A method of transmitting radio frequency signals for use in a radio telecommunication apparatus including modulating means for modulating signals to be transmitted and amplifying means connected to said modulating means for amplifying the modulated signals, comprising the steps of:

detecting the presence of signals to be transmitted by said apparatus;

supplying said modulating means with electric power in response to a detection of the presence of signals to be transmitted; and supplying said amplifying means with electrical power after the power supply to said modulating means is initiated.

11. The method of claim 10 further comprising a step of detecting when said modulating means is frequency locked and generating a locking detection signal and wherein the power supply to said amplifying means is initiated in response to the locking detection signal.

12. The method of claim 10 further comprising the step of measuring a predetermined time passage and wherein said modulating means is supplied power after a predetermined time period has elapsed from the time when said modulating means is initially supplied power.

* * * * *